June 21, 1932.  W. COHN-BYK ET AL  1,864,483
BIMETALLIC THERMOSTAT
Filed March 25, 1930
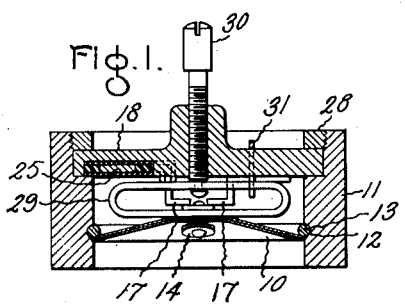
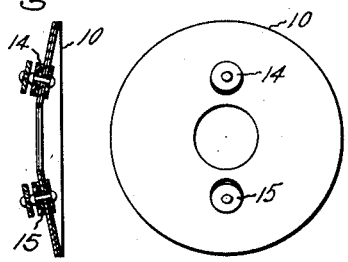
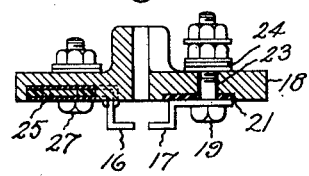
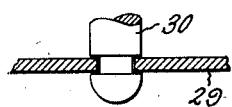
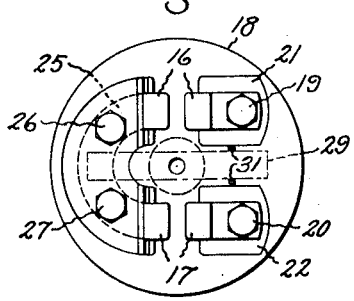
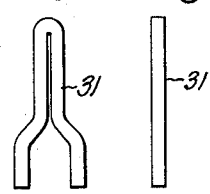
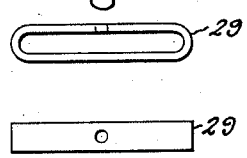
Inventor:
Walter Cohn-Byk,
Alexander von Pap,
by Charles E Mulla
Their Attorney.

Patented June 21, 1932

1,864,483

UNITED STATES PATENT OFFICE

WALTER COHN-BYK, OF BERLIN, AND ALEXANDER von PAP, OF CHARLOTTENBURG, GERMANY, ASSIGNORS TO GENERAL ELECTRIC COMPANY, A CORPORATION OF NEW YORK

BIMETALLIC THERMOSTAT

Application filed March 25, 1930, Serial No. 438,861, and in Germany May 4, 1929.

Our invention relates to bimetallic thermostats and has for its object the provision of a simple and rugged thermostat operating with a snap action and which may be easily manufactured.

Bimetallic thermostats composed of two metals of different temperature coefficients of expansion have been used in connection with thermostatic regulating and controlling devices, as for instance in the control of electric heating appliances. In order to attain an instantaneous or snap movement of the thermostat for the regulating or switching operation the bimetallic thermostatic body has heretofore been constructed as a non-developable or non-unwindable surface such as a concavo-convex disc, which can not be flattened out or unwound. As a practical matter the manufacture of parts having such surfaces is comparatively difficult.

In accordance with the present invention the bimetallic thermostat is constructed as a developable or unwindable part which provides for an instantaneous movement from one stable position to the other. More specifically, the bimetallic body takes the form of an open truncated cone having a great angle of conicity, one edge of this hollow conical body being tightly clamped in a casing.

In the accompanying drawing Fig. 1 shows a longitudinal section through a thermostatic regulating device constructed in accordance with this invention; Fig. 2 is a sectional view of the cover of the casing showing the fixed contacts and the connecting screws; Fig. 3 is a view seen from underneath the cover; Figs. 4 and 5 are sectional and plan views respectively of the thermostat; Figs. 6 and 7 are elevation and plan views respectively of the regulating spring; Fig. 8 is a detail view showing the connection of the adjusting screw with the regulating spring; while Figs. 9 and 10 are front and side elevational views respectively of the fork which serves as a guide for the regulating spring.

Referring to the drawing, the thermostat body comprises a bimetallic washer or disc 10 which is developed as a surface of a truncated cone with a very great angle of conicity i. e., angle between its surface and the axes of the cone as shown in Figs. 4 and 5. As is customary in bimetallic thermostats, the thermostat 10 is formed of two layers of suitable metals having different temperature coefficients of expansion such as iron and brass, or in other words, two similar truncated cone parts are formed from the two dissimilar metals respectively, assembled together and joined as by brazing or welding to form a unitary bimetallic body.

In the specific switching arrangement shown the bimetallic thermostat 10 is enclosed in a cylindrical metallic casing or support 11. As shown, the casing is provided with an inner circumferential groove 12 into which the outer edge of the thermostat is forced and secured by means of a spring clamping ring 13. In order to effect the closing of an electric circuit, two movable electrical contacts 14 and 15 are secured directly to the thermostat in electrically insulated relation therewith at diametrically opposite points, while pairs of contacts 16 and 17 are secured to the cover member 18 of the casing in position to be respectively engaged and bridged by the movable contacts 14 and 15 when the thermostat is in its extreme uppermost position as shown in Fig. 1. As shown in Fig. 3, one contact of each of the two pairs 16 and 17 is secured to the cover 18 by means of terminal members 19 and 20, which are in electrically conducting relation with their respective contacts. These stationary contacts are electrically insulated from the cover 18 by insulators 21 and 22 respectively, while the terminal members are electrically insulated by tubular insulators 23 and insulating washers 24. The opposite contact of each pair is formed on the respective end of a semi-circular conducting member 25 which is secured to the cover 18, in electrically insulating relation therewith, by means of the bolts 26 and 27. As indicated in Figs. 1 and 2, the ends of the stationary contacts are bent downward somewhat away from the cover 18. With this arrangement it will be observed that the bridging of the two pairs of contacts by the movable contacts 14 and 15 establishes an electrical circuit from one terminal member 19 to the other terminal member 20. The plate 18 is secured to the casing 11 by means of a screw ring 28.

In order to vary the operating temperature of the thermostat within certain limits a supplemental force is applied to the upper free edge of the thermostat body 10, the effect of which is to more or less enhance the snap movement and thus vary the temperature at which the snap movement occurs. For this purpose a spring member 29 which is rectangular or oval in shape, as shown in Figs. 6 and 7, is mounted above the bimetallic body 10 on the lower end of a screw shaft 30 secured centrally in the cover 18. As shown in Fig. 8, a loose pivotal connection is provided between the spring 29 and the shaft 30 so that the shaft may be turned independently of the spring, and in order to secure the spring against rotary movement a fork 31 shown in detail in Figs. 9 and 10 is secured to the cover 18 so as to embrace the spring 29.

In the operation of the device the conical surface of the thermostat will be snapped downward at a certain degree of heating, if the metal of the thermostat having the higher coefficient of expansion lies on the outer or dished side. In the upper or mantle surface, radial and tangential strains are set up by the changes in temperature which must be overcome before the thermostat can be moved out of this stable position. As soon as the force generated by the effect of the heat is sufficiently great to overcome this resisting tension in the metal forming the upper or mouth side of the thermostat body, the conical surface will be instantaneously snapped over from the upward stable position to the lower one, that is, to a reverse position. After the thermostat body has cooled down, the conical portion will again also momentarily spring back into the initial position.

What we claim as new and desire to secure by Letters Patent of the United States, is:

1. A snap acting thermostat comprising a bimetallic washer initially shaped in the form of a truncated cone with its surface at a relatively great angle with the axis of the cone so as to snap to a reverse position upon changes in temperature.

2. A snap acting thermostat comprising a bimetallic washer initially shaped in the form of a truncated cone with its surface at a relatively great angle with the axis of the cone so as to snap to a reverse position upon changes in temperature, and a support for one edge of said washer.

3. A snap acting thermostat comprising a bimetallic washer initially shaped in the form of a truncated cone, with the metal of higher temperature coefficient of expansion being on the outer side of said washer whereby said thermostat snaps to a reverse position upon an increase in temperature.

4. A snap acting thermostat comprising a bimetallic washer initially shaped in the form of a truncated cone with the metal having the higher temperature coefficient of expansion on the outer side of said washer whereby said washer snaps to a reverse position upon an increase in temperature, and a rigid support for the outer edge of said washer.

5. A snap acting thermostat comprising a bimetallic washer initially shaped in the form of a truncated cone with its surface at a relatively great angle with the axis of the cone so as to snap to a reverse position upon changes in temperature, a support for one edge of said washer, resilient means for applying a variable force to the other edge of said washer in one of said positions tending to snap said thermostat to the other position and means for adjusting said resilient means.

In witness whereof, we have hereunto set our hands this 3rd day of February, 1930.

WALTER COHN-BYK.
ALEXANDER v. PAP.